United States Patent [19]

Cigdem et al.

[11] Patent Number: 4,683,998

[45] Date of Patent: Aug. 4, 1987

[54] FLUID FRICTION CLUTCH, UTILIZING FLUID SHEAR FORCE BETWEEN CLUTCH PLATES AND CAMMING OF PLATES TOGETHER TO INCREASE FLUID SHEARS FORCES, ESPECIALLY FOR DIFFERENTIAL GEARS OF MOTOR VEHICLES

[75] Inventors: Saffet Cigdem, Munich; Rudiger Lichnofsky, Krailling; Harry Martin, Neuried, all of Fed. Rep. of Germany

[73] Assignee: Bayerische Motoren Werke AG, Fed. Rep. of Germany

[21] Appl. No.: 799,115

[22] PCT Filed: Mar. 12, 1985

[86] PCT No.: PCT/EP85/00097

§ 371 Date: Nov. 22, 1985

§ 102(e) Date: Nov. 22, 1985

[87] PCT Pub. No.: WO85/04226

PCT Pub. Date: Sep. 26, 1985

[30] Foreign Application Priority Data

Mar. 12, 1984 [DE] Fed. Rep. of Germany ....... 3408977

[51] Int. Cl.⁴ .................. F16D 35/00; F16H 1/44
[52] U.S. Cl. .................... 192/58 C; 192/35; 192/54; 192/93 A; 74/711
[58] Field of Search ............ 192/35, 83, 36, 58 C, 192/58 B, 54, 93 A; 74/711, 710.5; 64/26

[56] References Cited

U.S. PATENT DOCUMENTS

| 3,596,740 | 8/1971 | Nau . |
| 4,040,271 | 8/1977 | Rolt et al. . |
| 4,058,027 | 11/1977 | Webb . |
| 4,238,013 | 12/1980 | Goscenski ............................. 192/54 |
| 4,462,272 | 7/1984 | Roper ........................... 192/93 A X |
| 4,576,264 | 3/1986 | Lupo et al. .................... 192/93 A X |

FOREIGN PATENT DOCUMENTS

| 1235075 | 2/1967 | Fed. Rep. of Germany . |
| 1288361 | 1/1969 | Fed. Rep. of Germany . |
| 2225096 | 4/1976 | Fed. Rep. of Germany . |
| 1333878 | 10/1973 | United Kingdom . |
| 2135424 | 8/1984 | United Kingdom . |

Primary Examiner—George H. Krizmanich

[57] ABSTRACT

A fluid friction clutch for use in differential gears of motor vehicles having a sliding member which has a adjusting disc which changes the spacing of the clutch plates, which adjusting causes the clutch plates to approach closer to one another and increases the clutch torque provided by a viscous fluid of the fluid of the clutch. Adjustment takes place via starting slopes which are assigned to a cam driving connection employing a special development of the starting slopes with the torque characteristics being changed in a predetermined manner.

16 Claims, 12 Drawing Figures

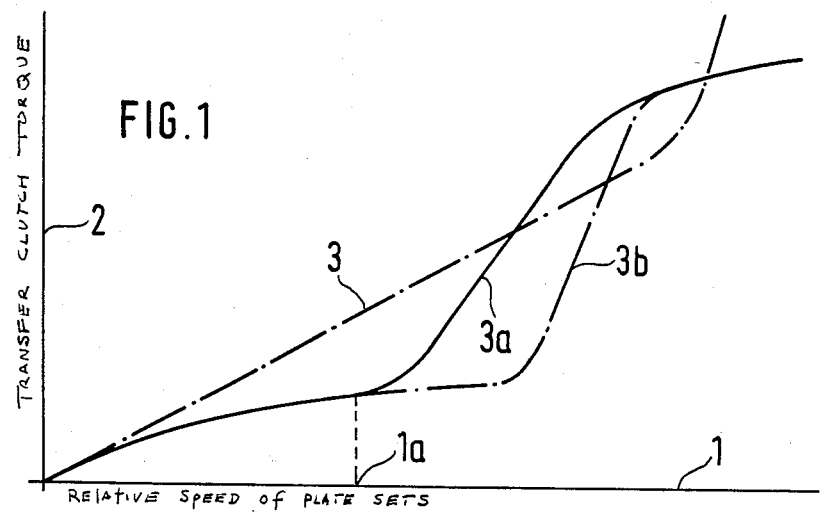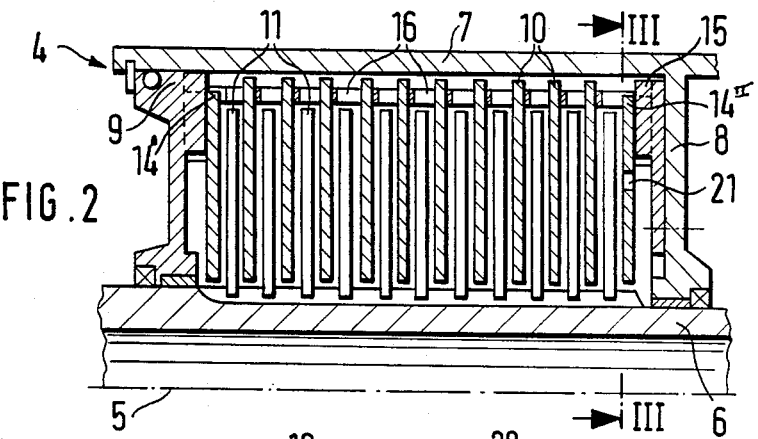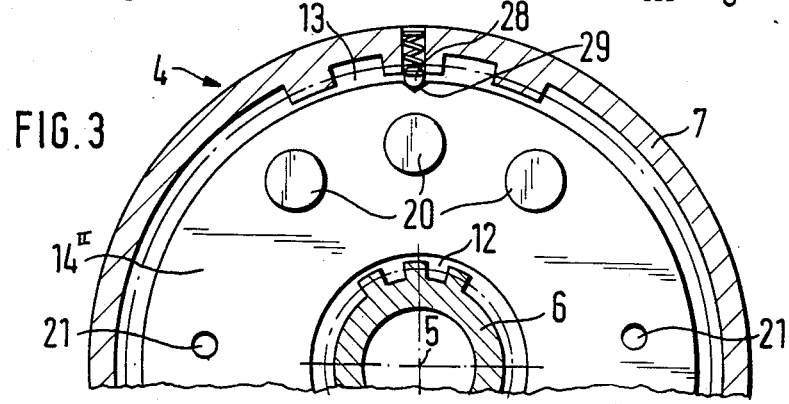

FLUID FRICTION CLUTCH, UTILIZING FLUID SHEAR FORCE BETWEEN CLUTCH PLATES AND CAMMING OF PLATES TOGETHER TO INCREASE FLUID SHEARS FORCES, ESPECIALLY FOR DIFFERENTIAL GEARS OF MOTOR VEHICLES

This invention relates to a fluid friction clutch, especially for differential gears of motor vehicles employing a closed toroidal chamber comprising a cylindrical inner body having an access, a drum-shaped outer body arranged coaxially to said inner body and which can be rotated with respect to the inner body and with radial walls between the inner body and the outer body, the toroidal chamber containing plate sets engaging with one another, having a ring-shaped clutch plate encompassing the inner body, the clutch plate being arranged alternately successively and at a distance to one another, the clutch plates of a first plate set being in driving connection with the inner body and those of a second plate set being in driving connection with the outer body, the toroidal chamber having a sliding member affecting the plate spacing that can be axially moved and is developed as a rotating body.

Fluid friction clutches of this type are able to transfer torques and clutch torques as soon as the plate sets twist or rotate with respect to one another. The reason is the internal friction of the viscous medium. The higher the relative speed of the plate packets, the larger the moments that can be transferred. However, the transferrable torque is also reciprocal with respect to the plate spacing; thus it rises with decreasing spacing.

Because of this characteristic, fluid friction clutches are also suitable to be used as differential locks in differential gears of motor vehicles. In this case, one plate set, with respect to the drive, is connected with one output gear wheel, while the other plate set is either in driving connection with the differential cage or with the second output gear wheel. In this context, differential gears are meant which are installed between the two rear-axle shafts of a driving axle—thus so-called axle differentials—as well as those which are provided between two driving axles—combined with a transfer-gear box—of a four-wheel drive. The fluid clutches are either integrated into the structure of the differential gear or are combined with the differential gear as a separate unit.

A known fluid friction clutch for use in a motor vehicle is shown in U.S. Pat. No. 4,058,027. Actually two of such fluid clutches are disclosed which are separated from one another by a ring piston. Starting at a certain operating condition, one of the clutches also operates as a conventional friction clutch. When, in the case of this arrangement, the driving wheels rotate at different speeds, this causes the mentioned twisting or rotation of the plate sets in the differential gear. Because of the internal friction of the viscous medium, this twisting or rotation results in a rise in temperature which in turn causes a pressure rise in the toroidal chamber. In this case, the temperature rises the faster, the higher the differential speed between the plate sets. The rising pressure moves the ring piston in axial direction which, as a result, pushes the clutch plates together. The fluid friction clutch, as a result, can transfer an increasingly high torque which in reality has the effect of an increasingly strong locking of the differential gear. In the case of the known device therefore, by means of the temperature rise in the toroidal chamber, the differential gear is locked gradually as a function of the differential speed.

However, an increased temperature may be damaging to the viscous medium. It may in time lose its inherent qualities which are necessary for the perfect operation of the fluid friction clutch.

The known fluid friction clutches also have another disadvantage which occurs especially when they are provided in a differential gear for a four-wheel drive. During rapid driving, there will, as a rule, occur a difference of height of the body of the vehicle at the front axle and the rear axle. This causes differing dynamic wheel radii at the front and rear wheels with the result that the driving axles leading to the wheels must turn at differing speeds. In the differential gear which, in this case, is assigned to the transfer gear box this, in turn, results in a mutual twisting or rotation of the plate sets with the described rise in temperature and the resulting partial locking of the differential gear. In other words: In a driving situation in which a locking of the differential gear is not desirable, such a locking is caused by the previously known fluid friction coupling. The result is a lowering of the efficiency as well as the danger of a damaging of the viscous medium because of the permanently raised temperature.

It is an object of the invention to, in the case of a fluid friction clutch of this type, achieve the changing of the spacing of the clutch plates in a manner other than by a rise in temperature. In addition, the fluid friction clutch should not tend to lock in an undesirable manner.

An object of the invention is to provide a fluid friction clutch with at least one ring-shaped adjusting disk which, on one side thereof is parallel to and at a distance opposite a clutch plate of one driving connection and on the other side thereof by way of at least one starter slope interacts with a second driving connection.

In the case of the fluid friction clutch according to the invention, the change of the plate spacing is, on the one hand, caused by the transverse forces occurring between the viscous medium and the adjusting disk as well as the adjacent plate and, on the other hand, by the starting slope, a term the meaning of which will become apparent from the ensuring description, of lateral surfaces located on at least one of the adjusting disk and adjacent plate. The transverse forces increase with a rising differential speed. By means of the transverse forces, the adjacent clutch disk, during its turning or rotation about it axis, tries to take along the adjusting disk. The adjusting disk, caused by the starting slope, in the case of increasing transverse forces, moves advancing toward the clutch plate. The clutch plates are pushed together as a whole and as a result their mutual spacing is decreased. As mentioned above, they will consequently be able to transfer an increasingly large torque.

The transverse forces that build up are also connected with the internal friction of the viscous medium. Consequently, here also, a rise in temperature will occur. Since, however, this rise in temperature is not used for adjusting the plates, the rise in temperature can be kept within limits by the selection of the medium and the dimensioning of the fluid clutch so that there is no danger for the medium.

It is not important for the operation of the clutch according to the invention whether the starting slope is assigned to the outer body or the inner body. It must only be designed in such a way that it rises in axle direction of the clutch in order to be able to cause an axial excursion of the adjusting disk.

It is especially advantageous when the starting slope does not rise continuously but first has a steeper and then a flatter slope. As a result, the clutch according to the invention is especially suitable for the transfer gear box of a four-wheel drive where, as already mentioned, the plate sets of the clutch twist or rotate with respect to one another also when driving straight at an increased speed. The transverse forces required for the excurion of the adjusting disk are determined by the sloping of the starting slope. On the one hand, the transverse forces increase with a rising speed difference between the plate sets, and on the other hand, with a decreasing spacing between the adjusting disk and the adjacent clutch plate. In order to overcome the steeper section of the starting slope, the transverse forces required for this purpose essentially can be generated only by an increasing speed difference because the adjusting disk at first does not carry out a noticeable excursion. In the case of a suitable design, the mentioned speed difference occurring when driving straight rapidly may still be too small for generating the transverse forces required to overcome the steeper section. In other words: In the case of this speed difference, the adjusting disk does not carry out a noticeable excursion and can therefore also not reduce the overall plate spacing so that the clutch torque also remains small and the efficiency of the drive train does not decrease noticeably. This effect may still be reinforced by a snap connection that will be described in more detail later.

The rotating direction of the individual plate packets is not fixed. According to the driving direction, they may turn in one or the other direction. It is therefore practical to assign at least one starting slope to each rotating direction. In order to increase the effect of the arrangement, it is advantageous to provide several starting slopes for each rotating direction.

In an advantageous embodiment, the starting slope is assigned to the adjusting disk. In this case, the starting slope may be constructed in one piece with the adjusting disk. In this case, the starting slope may support itself at a structural part via a rolling body, such as a ball, said rolling body, in turn, in a stable manner with respect to twisting or rotation, being assigned to the corresponding driving connection. It is also advantageous to press the adjusting disk with its starting slope against this structural component. As a result, a perfect rolling-off or sliding is achieved, on the one hand, and, on the other hand, the adjusting disk is always pushed back into its starting position when the plate sets stop moving. Magnetic elements which are advantageously inserted into the adjusting disk can still support this pushing-back. By the use of such elements, the advantage is also achieved that the re-adjusting spring as a whole can be dimensioned to be weaker. This has an especially favorable result in the case of a re-adjusting spring that is formed by individual distance springs arranged between the clutch plates.

The starting slope may also be provided at a profile disk. This profile disk may have starting slopes on each side. In this case, one adjusting disk respectively is provided for each side of the profile disk. In another advantageous development, starting slopes are assigned to the profile disk as well as to the adjusting disk. These starting slopes are then designed to be mirror-inverted, and a rolling body will advantageously roll off again in the hollow space that they form. In a compact construction, the profile disk is fastened at a radial wall. In an especially simple design, the profile disk is left out and the starting slope is developed at a radial wall of the toroidal chamber. As a result, an even more compact construction is achieved.

In order to increase the efficiency of the transverse forces, in another advantageous embodiment, the clutch plates of a plate set are used as adjusting disks. In this case, the clutch plates are disposed on a sleeve-type plate support, the one front side of which is assigned to the starting slope. In the case of this arrangement, the transverse forces between the clutch plates are added up so that the overall adjusting force is increased.

When the adjusting disk moves in the direction of the clutch plate, it must push away the viscous medium. In order to achieve a targeted behavior here, it is also advantageous to provide in the adjusting disk at least one passage bore through which the medium can flow. Via the size of the diameter, the throughput can be controlled or throttled and thus the excursion speed of the adjusting disk can be influenced.

The foregoing and other objects, features and advantages of the present invention will become more apparent from the following description when taken in connection with the accompanying drawings which show, for the purposes of illustration only, one embodiment in accordance with the present invention, and wherein:

FIG. 1 are several sequences of the clutch torque of a fluid friction clutch;

FIG. 2 is a section of a fluid friction clutch according to the invention;

FIG. 3 is the clutch according to FIG. 2 along the section III—III;

Figure 4:
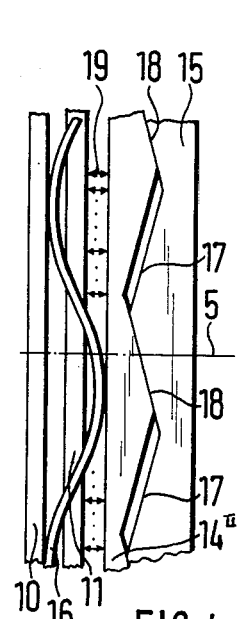
FIG. 4 is a layed-out representation of the adjusting disk and plate arrangement.

Referring now to the drawings wherein like reference numerals are used to designate like parts and more particularly to FIG. 1, wherein is shown the relative speed between the individual plate sets entered on the abscissa 1, and the transferrable clutch torque entered on the ordinate 2. The curve 3 shows the continuous rise of the clutch torque with an increasing differential speed. In this case, the plate spacing changes just as continuously. It becomes continuously smaller.

Different types of torque characteristics 3a and 3b are obtained by means of a fluid friction clutch according to FIGS. 2 and 3. FIG. 2, in sectional view, shows only the upper section of the fluid friction clutch 4 connecting to the clutch shaft 5. For purposes of simplicity, the lower section was left out. Generally, the clutch shaft 5 is meant when in the case of the object discussed here, the shaft or the shaft direction is mentioned. The fluid friction clutch 4 is provided for a differential gear of a motor vehicle. However, it is not limited to the motor vehicle sector. It can also be used in general in driving technology. The parts of the differential gear that surround the fluid friction clutch 4 are not shown.

The fluid friction clutch 4 has a closed toroidal chamber which is formed of a cylindrical inner body 6, a drum-shaped outer body 7 that is arranged coaxially to said inner body 6 and is twistably rotatively held on the cylindrical inner body 6, and of radial walls 8 and 9 arranged between the inner body 6 and the outer body 7. In this case, the radial wall 8 is connected in one piece with the outer body 7 and the radial wall 9 is constructed separately from the inner body 6 and the outer body 7. The toroidal chamber is sealed off toward the outside and a viscous medium is located in it which may, for example, consist of silicone fluid. The toroidal chamber is almost completely filled with this medium.

The toroidal chamber contains two engaging plate sets having clutch plates 10 and 11. The clutch plates 10 and 11 can be turned or rotated around the clutch shaft 5 which at the same time is also the joint axis of rotation of the inner body 6 and the outer body 7. The ring-shaped clutch plates 10 and 11 are arranged alternately successively and at a distance from one another. In this case, the clutch plates 10, via splines, are in driving connection with the outer body 7, while the clutch plates 11, via a corresponding toothing, are with respect to drive connected with the inner body 6. The key grooves of the inner body 6 and the outer body 7 in FIG. 3 have reference number 12 and 13.

A sliding member is also arranged in the toroidal chamber which in FIG. 2 consists of ring-shaped adjusting disks 14 that can be turned or rotated around the clutch shaft 5. The adjusting disk $14^i$ and $14^{ii}$ can be twisted or rotated with respect to the inner body 6 and, even though only within certain limits, also with respect to the outer body 7. In addition, the adjusting disk $14^i$ is at a distance opposite the last clutch plate 11 of one clutch set. With the other side, the adjusting disk $14^{ii}$ is in contact with a structural part 15 which, via an indicated screwed connection, is connected with the radial wall 8. However, the structural part 15 may also be constructed in one piece, with this radial wall 8. In FIG. 2, the adjusting disks $14^i$ and $14^{ii}$ are assigned respectively to each radial wall 8, 9. In the further course of the description, however, only that adjusting disk located the radial wall 8 will be discussed. The statements apply to the other one correspondingly.

Distance springs 16 are provided between the individual clutch plates 10, said distance springs 16 spacing the clutch plates. In addition or exclusively, such component springs may also be arranged between the clutch plates 11.

FIG. 4 shows the toroidal chamber from above in the area of the adjusting disk 14 in a cut away representation. The cylinder wall of the outer body 7 is removed. The structural part 15, on one of its sides which is facing the adjusting disk $14^{ii}$ and is essentially vertical to the clutch shaft, has several starting caming slopes 17, 18 on lateral surfaces distributed at the circumference. The slopes 17 are assigned to one rotating direction, and the starting slopes 18 to the other one. Both types of starting slopes are angularly disposed with respect to and rise in axial direction of the clutch shaft 5. At its side facing the structural part 15, the adjusting disk 14 has a shape that matches the starting slopes 17, 18 and with it, via the distance springs 16, is pressed against the structural part 15.

The device operates as follows: In the normal condition, when the clutch plates 10 and 11 do not twist or rotate with respect to one another, the adjusting disk 14 also does not twist or rotate with respect to the clutch plate 11. When a driving situation occurs where the clutch plates twist with respect to one another, the adjusting disk 14 is first taken along by the outer body 7 via the structural part 15 and the radial wall 8. As a result, it twists or rotates with respect to the clutch plate 11. By means of the viscous medium, transverse forces are built up between the clutch plate 11 and the adjusting disk $14^{ii}$ which in FIG. 4 is shown symbolically by means of Arrows 19. These transverse forces now try to take along the adjusting disk $14^{ii}$ in rotating direction of the clutch plate 11. In the process, the adjusting disk $14^{ii}$ slides on the starting slope 18 and is axially pressed in the direction of the clutch plate 11. The distance between these structural parts decreases and with it all distances between the individual clutch plates 11 and 10. Because of the decreasing distances between the plates, the transferrable torque rises between the inner body 6 and the outer body 7 until both are connected with one another practically rigidly. In order to avoid an unlimited excursion of the adjusting disk $14^{ii}$, it has stops that are not shown.

The distance springs 16 take over the resetting of the adjusting disk 14. FIG. 3 outlines magnetic elements 20 which are located in the adjusting disk 14 and which also support this resetting by magnetically pulling disc $14^{ii}$ closer to structural part 14.

As already mentioned, the curve in FIG. 1 shows the course of the torques of the fluid clutch according to FIGS. 2 to 4. In order to change the slope of this curve, throttling bores 21 (FIG. 2 and 3) may be provided in the adjusting disk 14.

Figure 5:
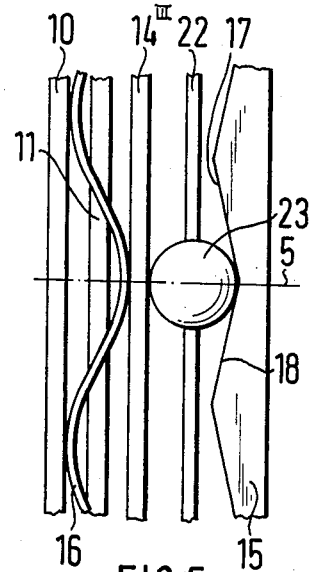
FIGS. 5, 6 and 7 are the same type of representations as in FIG. 4 with different developments of the starting slope.
Figure 6:
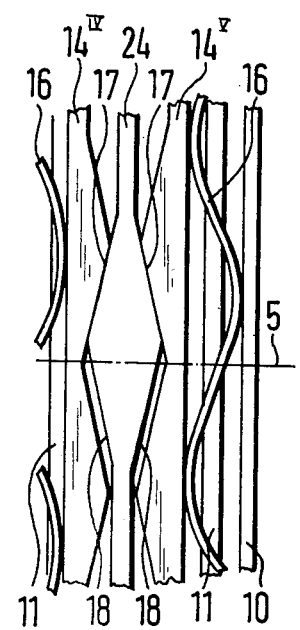
Figure 7:
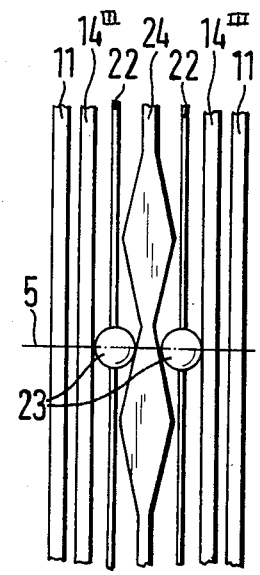

In FIGS. 5 to 7, the adjusting mechanism is shown in a different way than in FIG. 4. Thus FIG. 5 shows a ball cage 22 with a ball 23 that is contained in it which, on the one side, rolls off at the starting slopes 17, 18 and, on the other side, acts against the flat adjusting disk $14^{iii}$. What is not shown but can be recognized easily is that the arrangement may also be reversed. In this case, the starting slopes 17, 18 would be provided at the adjusting disk 14. Corresponding starting slopes may also easily be developed at the adjusting disk 14 and at the structural part 15.

In FIG. 6, the structural part 15 is replaced by a profile disk 24. The profile disk 24 may be arranged somewhere in the plate packet. It is in driving connection with the outer body 7. At both its sides, it has starting slopes 17 and 18 and correspondingly, two adjusting disks $14^{iv}$ and $14^v$ are assigned to it which in turn are developed like the starting slopes 17, 18.

The embodiment according to FIG. 7 differs from that according to FIG. 6 by the fact that similar to FIG. 5 balls 23 roll off at the starting slopes 17, 18. It should be pointed out that more than one profile disk $14^{iii}$, $14^{iv}$ and $14^v$ with correspondingly many adjusting disks according to FIGS. 6 and 7 may be arranged in the plate packet.

Figure 9:
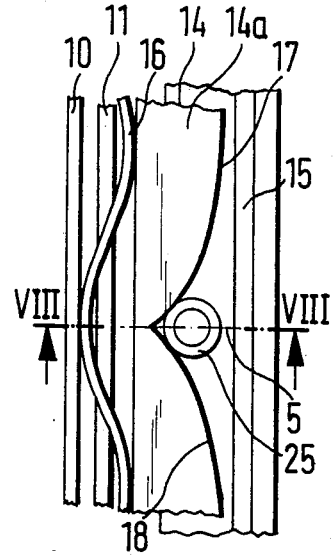
FIG. 9 is a view from above on FIG. 10 in a layed-out representation.
Figure 8:
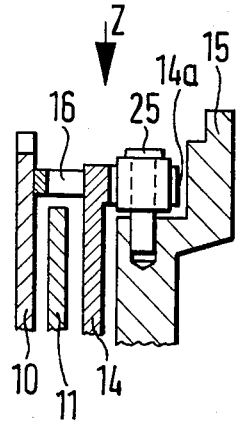
FIG. 8 is another embodiment of the starting slope.

In the case of the embodiment according to FIGS. 8 and 9, the axial adjustment of the adjusting disk 14 is again carried out in the area of the radial wall 8. FIG. 9 here shows the view in the direction of the Arrow Z. A structural part $15^i$ corresponding to FIG. 2 here carries one or several rolling bodies 25 which can be turned vertically to the clutch shaft 5. The adjusting disk 14 has a flange 14a that is bent in parallel to the clutch shaft 5 and faces the structural part $15^i$. The starting slopes 17, 18 are developed at the front side of said flange 14a. The rolling body 5 moves in these starting slopes.

The statements according to FIGS. 8 and 9 as well as those according to FIGS. 2 and 4 may be expanded by the fact that a corresponding adjusting device is provided at each radial wall. In this case, it must be ensured, however, that also the radial wall 9 with respect to drive is connected with the outer body 7. Furthermore, it is clear that the whole arragement can be constructed in the reverse sense, i.e., the starting slopes are not assigned to the outer body 7 but to the inner body 6, and the transverse forces develop between the adjusting disk 14 and a clutch plate 10. However, in this case, to the extent that the starting slopes are provided at the radial wall 8 and 9, these starting slopes must be connected with the inner body 6 in a rotationally stable manner.

Figure 10:
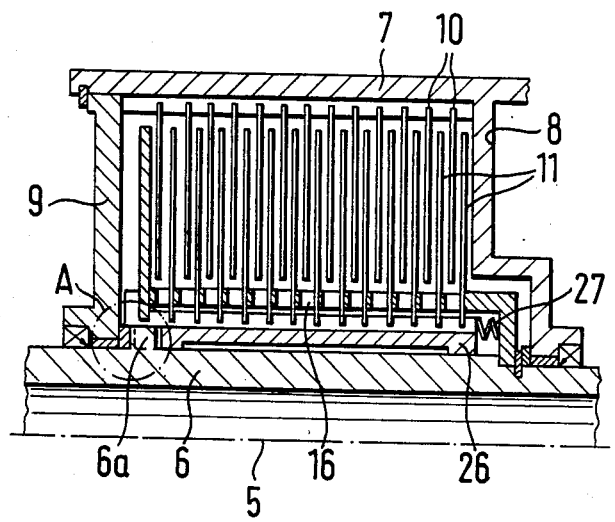
FIG. 10 is an embodiment where the clutch plates of one plate set are used as adjusting disks.

An arrangement that goes in this direction is shown in FIG. 10. In this case the sliding member is built up via a sleeve-type plate support 26 arranged coaxially to the inner body 10, with which the clutch plates 11 are connected in a rotationally stable manner. Here, these clutch plates 11 form the adjusting disks 14 in the sense of the invention. The plate support 26, with one front side, pushes against a collar 6a (in FIG. 10 indicated by the circle "A".) At the collar 6a or at the front side of the plate support 26, the corresponding starting slope is developed again which may, for example, have the shape corresponding to FIGS. 4 or 5. A spring 27 presses the plate support 26 against the collar 6a. This arrangement makes it possible to use the total clutch torque of all plates of one plate set, here of the clutch plates 11, as a control quantity for the spacing. This results in a favorable relationship between the clutch torque and the friction moment at the starting slopes.

Figure 11:
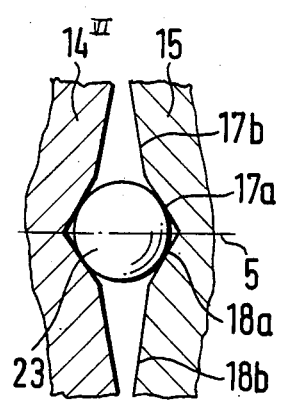
FIGS. 11 and 12 are starting slopes having different angles of slope.
Figure 12:
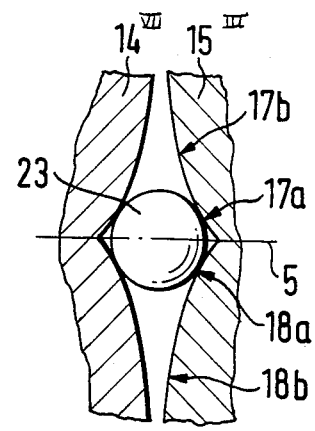

Special developments of the starting slopes are shown in FIGS. 11 and 12. First, in this, case, the adjusting disk 14$^{vi}$ as well as the structural part 15$^{ii}$ of FIG. 11 (compare FIG. 2) each have corresponding starting slopes 17, 18. Each starting slope 17, 18 is divided into an initial steeper sloping section 17a, 18a which then changes into a flat section 17b, 18b. In FIG. 11, the adjusting disc 14$^{vi}$ and structural part 15$^{iii}$ have curved caming section in which these sections are produced by two meeting flat surfaces, in FIG. 12 by different radii. By means of starting slopes 17, 18 that are developed in this way, a course of torques is achieved, as the one having the reference number 3a in FIG. 1. That results from the fact that the increases of transverse forces and thus the increase of the differential speed of the plate sets must be larger as long as the ball 23 is located in the steeper section 17a, 18a of the starting slopes 17, 18. Starting approximately at speed 1a (FIG. 1), the ball 23 moves into the flatter section 17b, 18b.

In FIG. 1, the curve 3b also shows a more defined course with respect to the speed 1a. This course is achieved by means of a snapping device, such as it is shown in FIG. 3. In the cylindrical shell of the outer body 7, at the circumference, one or several spring-loaded balls 28 are held which engage in corresponding notches 29 of the adjusting disk 14. In the case of this arrangement, the adjusting disk 14 will not move before the transverse forces are so large that they can push the balls 28 out of the notches 29. In the case of a corresponding design, this takes place at the speed 1a. This snap connection may also be used in connection with the starting slopes 17, 18 according to FIGS. 11 and 12. Also, such a snap connection may be provided at the plate support 16 in FIG. 10.

It should also be noted that the above-described embodiments may also, if this is advantageous, be arbitrarily combined with one another.

While we have shown and described only one embodiment in accordance with the present invention, it is understood that the same is not limited thereto but is susceptible to numerous changes and modifications as known to one having ordinary skill in the art and we therefore do not wish to be limited to the details shown and described herein, but intend to cover all such modifications as are encompassed by the scope of the appended claims.

We claim:

1. A fluid friction clutch, in particular for differential gears of motor vehicles, a closed toroidal chamber comprises a cylindrical inner body having an axis, a drum-shaped outer body arranged coaxially to said inner body and which can be rotated with respect to the inner body and with radial walls between the inner body and the outer body, the toroidal chamber containing plate sets engaging with one another, having ring-shaped clutch plates encompassing the inner body, said clutch plates being arranged alternately successively and at a distance to one another, while the clutch plates of a first plate set are in driving connection with the inner body and those of a second plate set are in driving connection with the outer body, the toroidal chamber having a sliding member affecting the plate spacing that can be axially moved and is developed as a rotating body, wherein the sliding member can be rotated with respect to the inner body and the outer body and comprising at least one ring-shaped adjusting disc which, on the one side thereof, is parallel to and at a distance opposite a clutch plate of one driving connection, and on the other side thereof, via at least one starting slope interacts with a second driving connection to move one set of plater closer to the other set of plates without touching, said toroidal chamber being fluid tight and able to contain a viscuous driving fluid for the fluid friction clutch and wherein the coming closer together of the two sets of plates caused an increased torque transfer between the two sets of plates by the viscous fluid medium.

2. A clutch according to claim 1, wherein the starting slope is angularly disposed with respect to and rises in an axial direction with respect to said axis is provided at a lateral surface of a rotating structural component extending essentially orthogonally with respect to the clutch shaft.

3. A clutch according to claim 2, wherein the starting slope from a starting position on the lateral surface first rises steeper and than flatter.

4. A clutch according to claim 2, wherein one starting slope is assigned to each rotating direction of the clutch shaft.

5. A clutch according to claim 1, wherein the starting slope is provided at the adjusting disk.

6. A clutch according to claim 1, wherein the starting slope is developed at at least one lateral surface of a ring-shaped profile disk in driving connection with the outer body and the adjusting disk is arranged adjacently to the profile disk.

7. A clutch according to claim 6, wherein the profile disk is connected with the interior side of one of said radial walls.

8. A clutch according to claim 6, wherein the profile disk has starting slopes at both lateral surfaces.

9. A clutch according to claim 6, wherein the sliding member, at a section thereof that is assigned to the starting slope, has a shape that matches its corresponding starting slope and via a spring is pressed against the starting slope.

10. A clutch according to claim 1, wherein the sliding member, by means of roller bodies interacts with the starting slope.

11. A clutch according to claim 5, wherein the adjusting disk has a flange that is bent substantially parallel to the clutch shaft and has a starting slope developed at a first side thereof, and wherein at least one of the radial walls or a structural part connected with it has a roller body engaging in the starting slope.

12. A clutch according to claim 1, wherein the sliding member, via a snap connection, is held in its initial position up to a predetermined speed difference between the plate sets.

13. A clutch according to claim 12, wherein the cylindrical shell of the outer body has at least one spring-loaded element which engages a notch provided at the circumferential surface of the adjusting disk.

14. A clutch according to claim 1, wherein the sliding member has a sleeve-type plate support arranged coaxially to the inner body, said plate support with a first side resting against the starting slope arranged on the inner body and wherein the adjusting disk is formed by the clutch plates assigned to the plate support.

15. A clutch according to claim 1, wherein the sliding member has magnetic elements disposed in the area of the starting slope.

16. A clutch according to claim 1, wherein at least one passage bore is provided in the adjusting disk.

* * * * *